Sept. 28, 1971   M. R. MAZURE   3,608,241
WINDOW OPERATING DEVICE FOR AUTOMOBILES
Filed April 16, 1969   2 Sheets-Sheet 1

INVENTOR
MIGUEL RODRIGO MAZURE

BY
*Michael S. Striker*
ATTORNEY

United States Patent Office 3,608,241
Patented Sept. 28, 1971

3,608,241
WINDOW OPERATING DEVICE FOR AUTOMOBILES
Miguel Rodrigo Mazure, Avenida Central 671,
Oficina 504–505, San Isidro, Lima, Peru
Filed Apr. 16, 1969, Ser. No. 816,629
Int. Cl. B60j 1/08
U.S. Cl. 49—72
4 Claims

ABSTRACT OF THE DISCLOSURE

An arrangement by which the windows of a car become automatically closed when the driver prepares to leave the automobile. A circuit closure to the window driving motors of the automobile is realized when the driver opens the door on his side and actuates the security latch. The circuit closure is formed through a switch actuated by the door and a switch actuated by the security latch. The switch actuated by the door becomes closed when the door is opened, and the switch actuated by the security latch becomes also closed when the latch is actuated for the purpose of securing the door. The windows of the automobile become thereby closed before the driver closes the door and leaves the car.

BACKGROUND OF THE INVENTION

In the use of automobiles, it is desirable to close the windows of the car automatically when a driver prepares to leave the car. This feature is advantageous for the purpose of avoiding theft which may take place when the car is unattended and the windows are open. It is also advantageous to close the windows automatically when the driver leaves the car, in order to prevent rain from entering into the interior of the car, through the open windows, and spoiling the upholstery.

Although a driver can normally close the windows of this car, he may at times forget to close these windows when he is in a hurry to leave the car, for example. He may, on the other hand, close one or some of the windows, but not all of the windows when similarly in a hurry, or when visibility is poor such as at nighttime. At other times, the driver may be fully aware that the windows are opened, but finds it too tedious to methodically close each and every one of the windows. Under such circumstances, the driver may leave the car and take the risk arising out of theft and spoilage of the interior of the car due to the elements of the environment or weather.

Consequently, if a device is installed within the car, in accordance with the present invention, and all of the windows become automatically closed when the driver prepares to leave the car, these problems associated with theft and ruining of the upholstery or interior of the car may be avoided.

When thus closing all of the windows of the car automatically, in accordance with the present invention, it is desirable that these windows be fully closed prior to the instant when the driver locks the car and leaves its location.

Accordingly, it is an object of the present invention to provide an arrangement whereby the windows of an automobile become automatically closed when the driver of the automobile prepares to leave.

It is another object of the invention to provide a window operating arrangement in which all of the windows of an automobile become automatically closed without requiring that the driver exercise any specific function which he would ordinarily not perform, upon leaving the car. This function is of specific importance, since the driver may possibly forget to perform this function if he does not normally carry it out in the conventional use of the car.

It is also an object of the present invention to provide an electrical circuit by which electrical motors or similar driving devices are energized immediately while the driver is preparing to leave the car, for the purpose of automatically closing the windows.

It is a specific object of the present invention that the windows of the automobile become closed, in the aforementioned manner, before the driver has closed the door on his side and locked it upon leaving. This feature assures that the driver can visibly determine and feel reassured that all of the windows of the car are closed before leaving the car's location.

It is also a specific object of the present invention to provide an electromechanical arrangement for automatically closing the windows of an automobile, which is simple in design and may be readily manufactured.

A further object of the present invention is to provide a window operating arrangement for automobiles, of the foregoing character, which is reliable in operation.

SUMMARY OF THE INVENTION

An arrangement for automatically closing the windows of an automobile when the driver prepares to leave the car unattended. A switch mounted on the frame of the door on the driver's side becomes actuated so as to form a circuit closure when this particular door on the driver's side is opened. The switch is open, on the other hand, when the door of the automobile is closed. The switch is of the single-pole single-throw type. Another single-pole single-throw switch is connected in series with the switch mounted on the frame of the door, and is actuated by the security latch of the door. This second switch becomes closed or closes the circuit through it when the security latch is actuated so that the door is securely latched or locked in place. When both of these switches are closed, a condition which occurs when the driver's door is open and the security latch has been actuated or transferred to locked position, a relay is actuated through a circuit closure through both switches, and as a result all of the motors of the car used for driving the windows become energized. Each window of the car is provided with an actuating or driving motor which will close the window when the motor becomes energized. The relay is a six-pole single throw relay which, when actuated through the circuit closure of the two switches, will energize automatically all of the motors associated with the windows of the car. Once any window has attained its closed position, a switch actuated by that particular window opens the circuit to the motor and thereby energizes the motor to prevent it from further driving the window. The operating relay is designed to be operated from the battery of the car.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
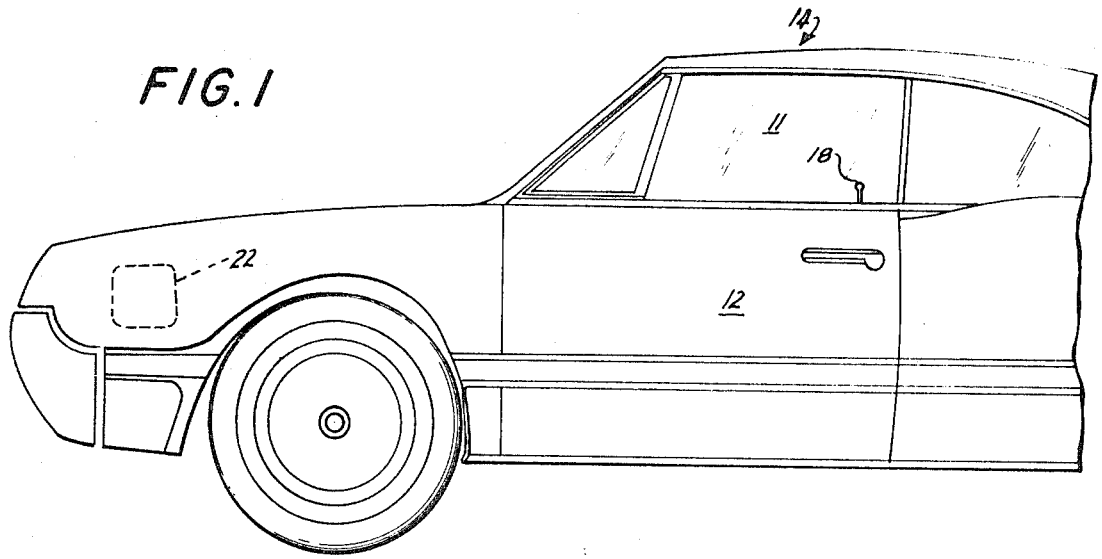
FIG. 1 is a partial side view of a conventional automobile, and shows the location of the switches used in forming a circuit closure for automatically closing the windows of the automobile, in accordance with the present invention.
Figure 2:
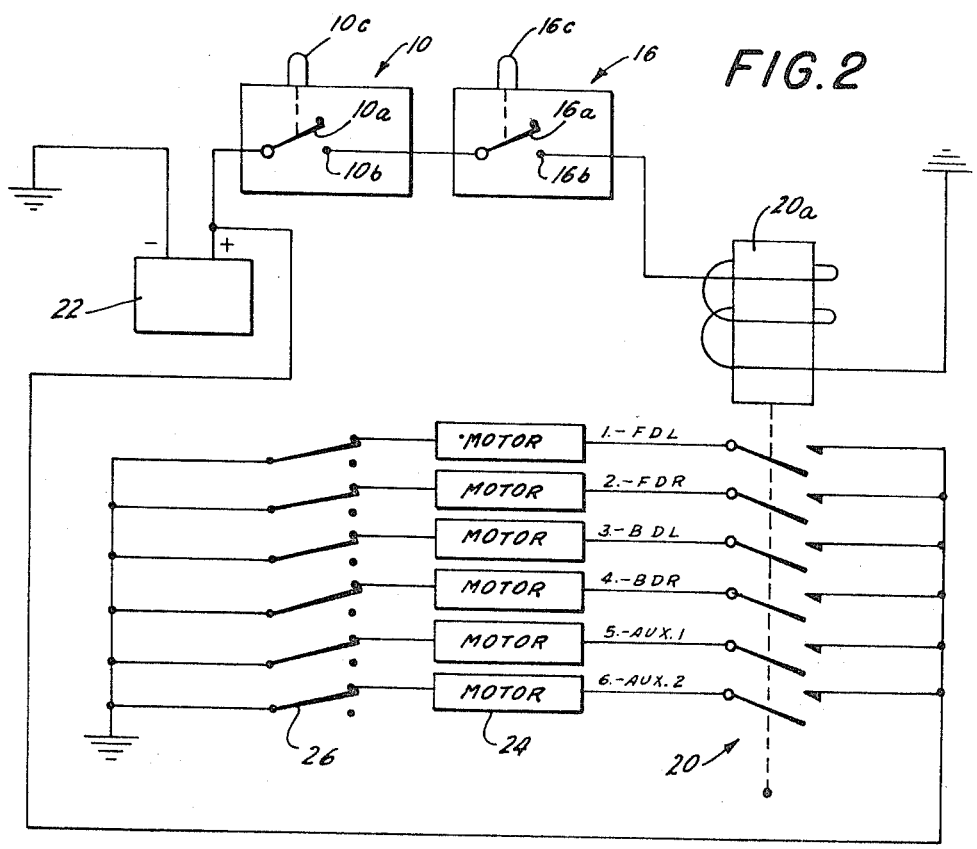
FIG. 2 is an electrical schematic diagram of the control circuit by which the window operating mechanism becomes energized for closing automatically the windows of the car when the driver prepares to leave the car.

Referring to the drawing, and more particular to FIG. 1, a single-pole single-throw switch 10 is mounted in the vicinity marked A in FIG. 1. The switch 10 is fixed to the side frame of the car and is of the push-button type of switch so that the button portion of the switch may be actuated through movement of the door 12 of a conventional automobile 14. Thus, the switch 10 has a movable contact 10a and a fixed contact 10b. An actuating button 10c is mechanically connected to the movable contact 10a and displaces the latter when the actuating button 10c is depressed. Accordingly, when the actuating button 10c is depressed in the switch 10 shown in the drawing, the circuit closure is formed through the switch, since the movable contact 10a is transferred into physical contact with the fixed terminal or contact 10b. This state of the switch 10, in which the movable contact 10a is against the fixed contact 10b, prevails when the door 12 is in open position so that it has been rotated on its hinges whereby the driver may enter or leave his seat. At all other times, when the door 12 is closed so that the door is flush with the side of the car, the actuating button 10c remains undepressed and the movable contact 10a is not in electrical contact wtih the terminal or fixed contact 10b. Accordingly, when the door 12 is in closed position, the switch 10 is open so that the circuit through the switch is open.

A second switch 16 is connected in series with the first switch 10. This switch 16 is also of the single-pole single-throw type and may be similar in construction to the switch 10. Thus, the switch 16 has a movable contact 16a and a fixed contact 16b. The movable contact is displaced or transferred in position through an actuating button 16c mechanically coupled to the movable blade by means of the functional broken line shown. The two switches 10 and 16 may be of the construction, for example, which is similar to the conventional switches which are commercially available under the trade name of Microswitch.

The switch 16 is located or mounted at the location B in FIG. 1. The switch is mounted so that the actuating button 16c is mechanically linked to the securing latch of the door, which is accessible to the driver at the location B. When the securing latch of the door 12 is actuated so as to secure the door in place, the actuating button 16c mechanically linked to the latch becomes actuated so that the movable contact 16a is transferred to its position where it is in physical contact with the terminal or fixed contact 16b. Accordingly, when the securing latch becomes manually actuated by the driver so as to secure the door, the switch 16 is closed and a circuit closure exists through the switch in view of the condition that the movable contact 16a lies against the fixed contact 16b. Thus, the switch 16 will be closed whenever the securing latch of the door 12 is actuated for the purpose of securing the door in place. When, on the other hand, the securing latch has not been actuated, the switch 16 is in open position.

When the driver of the automobile prepares to leave the car by opening the door 12, the switch 10 becomes closed through the transfer in position of the movable contact 10a to the position where the latter lies against the fixed contact 10b. If, now, the driver actuates the security latch 18 at the location B, the movable contact 16a of the switch 16 is transferred to the position where it lies in contact with the fixed contact 16b. As a result, a circuit is completed through the two switches 10 and 16, and a relay 20 becomes energized by circulating current through the coil 20a of the relay. This relay 20 may be located or mounted in the proximity marked C in FIG. 1. Thus, when the two switches 10 and 16 connected in series are both simultaneously closed, current flow takes place from the battery of the automobile and towards ground potential, by way of the solenoid coil 20a. The relay 20 is a six-pole single-throw relay with a 12 volt D.C. coil which may be operated from the conventional automobile battery. The positive terminal of the automobile battery 22 is connected to the series circuit of the switches 10 and 16 and leads to the coil 20a of the relay 20. At the same time, this positive terminal of the car battery 22 is also connected to each pole of the relay. In the embodiment shown in the drawing, each one of the fixed contacts of the six single-throw poles are connected to the positive terminal of the battery 22. The associated movable contacts of the six poles are, in turn, each connected to a separate window operating motor 24. Everyone of the windows of the automobile is porvided with a separate motor 24 since every window of the automobile 14 should be independently operable, so that each window may be above or below any other window as may be desired by the occupants of the car. A separate and independently operating motor 24 is provided with each one of the car windows, so as to permit such independent operation.

Whereas one terminal of the motor is connected through the movable contact of one of the six poles of the relay 20, the other terminal of the motor leads to ground potential by way of a switch 26. The latter switch is a single-pole single-throw switch connected in series with the motor circuit. A separate and independently actuated switch 26 is provided for each motor 24, and hence for each separate window of the automobile. It is the purpose of the switch 26 to interrupt or open the circuit to the motor 24 when the respective window driven by the motor is in closed position. When a particular window of the car is open and the motor 24 associated with the window commences to operate and to close the window, it is essential that the circuit to the motor become interrupted or discontinued after the window reaches its closed position, for if the motor were to continue to operate, it may result in fracture of the window or damage to the driving mechanism which drives or operates the window. The switch 26 serves the purpose of interrupting the motor circuit when the window has attained its closed position.

Figure 3:
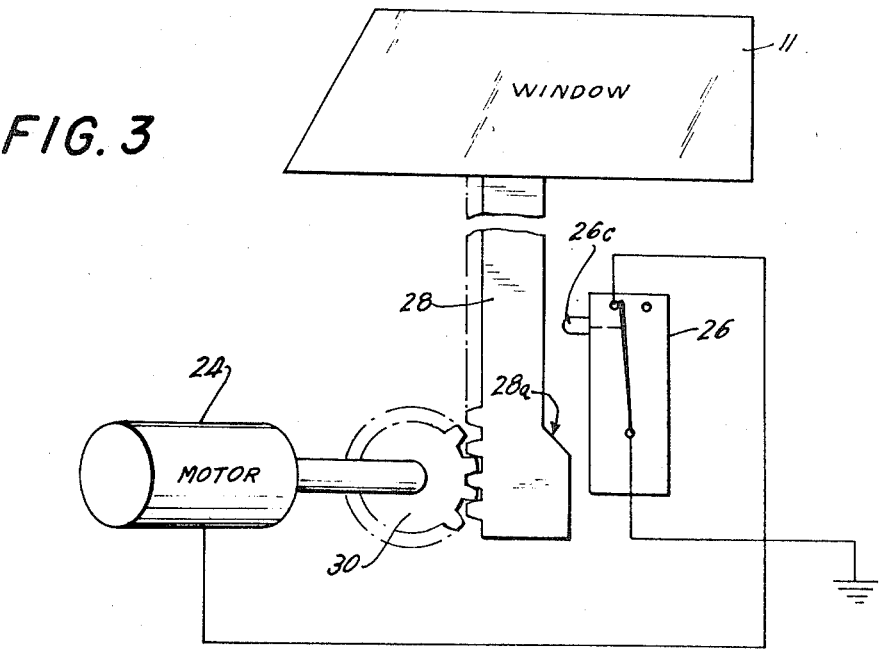
FIG. 3 is a functional schematic diagram of the window operating mechanism by which the window becomes mechanically driven for the purpose of becoming closed when the driver prepares to leave the automobile.

The driving mechanism by which the motor 24 closes its respective window of the car, is illustrated in FIG. 3. In this illustrative embodiment, the window 11 of, for example, the door 12 is linked or mechanically coupled to a gear rack 28 which is in mesh with a pinion 30 mounted upon the shaft of the motor 24. Accordingly, when the latter becomes energized through the closure of switches 10 and 16, the pinion 30 is rotated and the gear rack is moved translationally so as to close the window. The switch 26 which may be of the same construction as the switches 10 and 16, but which is normally closed, is mounted in relation to the gear rack 28 so that it becomes actuated by a cam edge 28a on the rack when the window is in closed position. Thus, the circuit to the motor remains uninterrupted and closed until the window has attained its closed position, at which point the cam edge 28a actuates the button 26c of the switch so that the latter becomes opened and the circuit to the motor becomes interrupted. Once this switch 26 becomes opened, the motor no longer drives and the window remains closed without having excessive pressures or forces applied to it by the driving motor.

It is not essential that the switch 26 be actuated directly by a mechanical link secured to the window being closed, as in FIG. 3.

Figure 4:
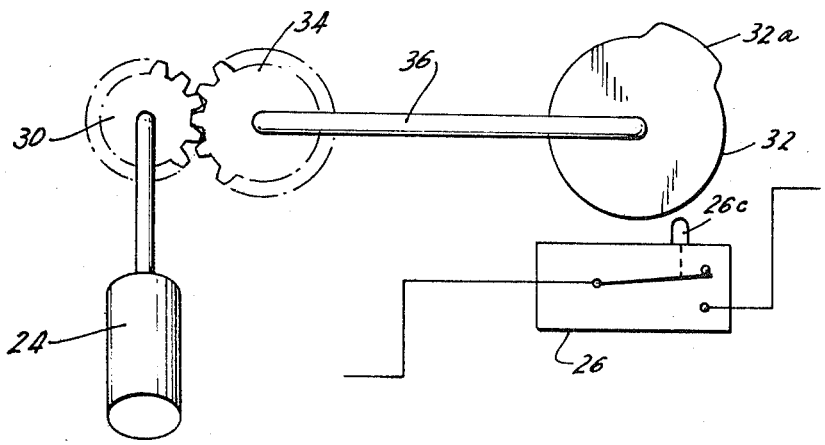
FIG. 4 is a functional schematic diagram and shows another embodiment of a switch actuating circuit used in FIG. 3.

In another embodiment shown in FIG. 4, the switch 26 becomes actuated by a cam 32 having a cam rise 32a. The cam 32 is mechanically rotated or driven by a gear 34 mounted upon a shaft 36 to which the cam 32 is secured. The gear 34 is, in turn, in mesh with the pinion 30 mounted directly on the shaft of the motor 24. Since the position of the window is directly related to the total angular rotation of the pinion 30, the position of the cam 32 is also directly related to the position of the window 11. By selecting the relative pitch diameters of the gears 30 and 34, the entire movement of the window 11 may be designated within one revolution of the cam 32. Accordingly, the cam rise 32a of the cam 32 may be positioned relative to the actuating button 26c of the switch 26, so that the switch 26 becomes opened when the window 11 is closed, whereby the cam rise 32a depresses the button 26c. Thus, the window may be closed in this embodiment of FIG. 4 with the gear rack 28 shown in FIG. 3. Instead of providing the rack 28 with a cam edge 28a, however, this actuating cam is mounted directly to a gear in mesh with the pinion 30. Accordingly, the switch 26 becomes actuated by the cam 32 linked to the gear 34, in FIG. 4, rather than by the cam edge 28a formed on the rack 28, in FIG. 3.

It is also quite possible to provide the switch 26 in the form of a pressure-sensitive switch mounted directly onto the window frame. When the window 11 becomes closed and thereby bears against the pressure-sensitive switch, the latter becomes opened and thereby ceases the operation of the motor 24.

Since it is desired to close all of the windows of the automobile when the latter is to be left unattended, a separate motor 24 and associated switch 26 is provided for each one of the windows. Thus, the six movable windows of the automobile are designated in the drawing by FDL (front door left), FDR (front door right), BDL (back door left), BDR (back door right), AUX. 1 (auxiliary window 1), and AUX. 2 (auxiliary window 2). Each motor circuit is individually closed through one of the poles of the relay 20, and one of the switches 26. When the relay 20 is actuated and the respective pole is closed, a circuit is completed between the positive terminal of the battery to ground potential or the other terminal of the battery, by way of the motor, provided that the respective window of the motor is in open position so that the switch 26 is in closed circuit state.

When the driver of the car is seated within the latter and has actuated the safety latch 18 so that switch 16 is closed, none of the motors 24 will operate because switch 10 will be in open position. Thus, when seated within the car so that the door is closed, the driver may secure the latch 18, while at the same time, retain full freedom of operation of the windows of the car. The windows of the car become closed only during the interval when the door 12 is opened while, at the same time, the latch 18 has been actuated to its safety secure position. During this interval when the motors operate and close the windows, the driver is made immediately aware of this condition, and he can then hold the door 12 opened for the few seconds that it may take to close the windows. Thus, when opening the door and actuating the latch 18, in the conventional manner, the movement of the window serves to make the driver immediately aware that the windows are being closed, and as a result the driver can allow for complete closing of the windows before leaving the car by closing the door 12 and locking it. It is thus seen, that the driver does not require to exercise any unconventional function which he would not ordinarily perform in the usual usage of a car.

It will be understood that each of the elements described above, or two or more together, may also find a useful application in other types of constructions differing from the types described above.

While the invention has been illustrated and described as embodied in a window operating arrangement for automobiles, it is not intended to be limited to the details shown, since various modifications and structural changes may be made without departing in any way from the spirit of the present invention.

What is claimed as new and desired to be protected by Letters Patent is set forth in the appended claims:

1. A window operating arrangement for an automobile comprising, in combination, first switching means actuated by a door of the automobile and emitting a signal when said door is in open position; second switching means connected in series with said first switching means and actuated by the safety securing latch of said door for transmitting said signal when said latch is in latched secure position; and operating means connected in series with said first and second switching means for moving the window when said signal is transmitted from said first and second switching means, said operating means comprising multiple pole relay means, each pole thereof corresponding to one window of the automobile, and said operating means further comprising individual motor means for each window of the automobile, each of said motor means being connected to said relay means to be energized to close said window when said relay is actuated.

2. An arrangement as defined in claim 1, wherein each of said motor means is connected to a respective pole of said relay means.

3. An arrangement as defined in claim 2, including battery means in the automobile and connected to said switching means and relay means for energizing said motor means.

4. An arrangement as defined in claim 3, including respective third switching means connected in series with each of said motor means for shutting off the latter when the respective window is closed; and individual cam means positioned by respective ones of said motor means for opening the corresponding said third switching means when the window is closed.

References Cited

UNITED STATES PATENTS

| | | | |
|---|---|---|---|
| 2,104,639 | 1/1938 | Dall | 49—24 |
| 2,378,500 | 6/1945 | Rappl | 49—72X |
| 2,696,981 | 12/1954 | Ayers | 49—24 |
| 2,820,628 | 1/1958 | Oishei et al. | 49—72 |
| 3,147,034 | 1/1964 | Maxey et al. | 49—72 |
| 3,168,303 | 2/1965 | Skinner | 49—103X |

FOREIGN PATENTS

| | | | |
|---|---|---|---|
| 979,050 | 1/1965 | Great Britain | 49—72 |
| 250,142 | 3/1964 | Australia | 49—72 |

DENNIS L. TAYLOR, Primary Examiner